United States Patent [19]

Medico, Jr.

[11] 4,144,931
[45] Mar. 20, 1979

[54] SOLAR HEATING AND COOLING COLLECTOR WINDOW

[76] Inventor: John J. Medico, Jr., 5331 Cape Leyte Dr., Sarasota, Fla. 33581

[21] Appl. No.: 716,653

[22] Filed: Aug. 23, 1976

[51] Int. Cl.² .................... F25B 29/00; F24J 3/02
[52] U.S. Cl. .................... 165/48 S; 165/49; 165/86; 165/135; 126/271
[58] Field of Search .............. 126/270, 271; 237/1 A; 165/48, 49, 86, 135

[56] References Cited

U.S. PATENT DOCUMENTS

| | | | |
|---|---|---|---|
| 2,595,905 | 5/1952 | Telkes | 237/1 A |
| 2,857,634 | 10/1958 | Garbade | 126/270 |
| 3,012,294 | 12/1961 | Waldor | 126/270 |
| 3,048,375 | 8/1962 | Walker | 126/270 |
| 3,251,407 | 5/1966 | Crosthwait | 126/271 |
| 3,321,012 | 5/1967 | Hervey | 126/271 |
| 3,884,414 | 5/1975 | Baer | 126/271 |
| 3,981,445 | 9/1976 | Custer | 126/270 |
| 3,990,635 | 11/1976 | Restle | 126/270 |
| 4,002,159 | 1/1977 | Angilletta | 126/270 |
| 4,014,313 | 3/1977 | Pedersen | 126/270 |

Primary Examiner—Charles J. Myhre
Assistant Examiner—Margaret LaTulip

[57] ABSTRACT

This invention comprises a solar unit in the form of a window having a plurality of vanes extending thereacross connected for unitary pivotal movement relative to the frame, together with means for adjusting the vanes for the collection of solar heat in utilizing such heat to heat water or air circulated through pipes carried by the vanes and connected to suitable headers at each end of the vanes or adjustment of the vanes to permit air and light to enter the enclosure in a wall of which the window collector is mounted and to permit circulation of cold water or air through the pipes extending through the vanes to cool the interior of the enclosure, as well as to permit adjustment of the vanes in such manner as to, in effect, to close the window from the outside of the enclosure from the outside atmosphere enveloping the enclosure, and to position the vanes in such manner as to augment either the heating or cooling of the enclosure as desired.

3 Claims, 5 Drawing Figures

SOLAR HEATING AND COOLING COLLECTOR WINDOW

An object of the present invention is to provide a window structure so designed and constructed that it may be utilized for collecting solar heat and dispensing said solar heat in an enclosure to be heated or adjusted and utilized in such manner as to cool the interior of the enclosure with which the window is associated.

A further object of the invention is to provide a window structure including a plurality of pivoted vanes connected to an support by a suitable frame, which vanes may be constructed of cooper, aluminum, or other suitable metal and are pivotally movable in unison by suitable means to expose one side of the vanes which are coated with heat absorbent paint for exposure of such services to the sunlight exteriorly of the enclosure in which the window is mounted for the purpose of heating water or air circulated through pipes extending the full length through the vanes and connected to headers located one at each end of the series of vanes.

The adjustable means will permit the vanes to be adjusted so that their non-coated surface are disposed so as to permit the emission of cooled air generated by the circulation of cooling water or air through the tube vanes may be delivered into the enclosure to be cooled while the vanes will, in effect, form a barrier for transmission of heat through the window from the outside. The vanes may be adjusted in any suitable intermediate position to allow the passage of light through the window structure.

With these and other objects in view, as many appear from the accompanying specification, the invention consists of various features of construction and combination of parts, which will be first described in connection with the accompanying drawings, showing a Solar Heating and Cooling Collector Window of a preferred form embodying the invention and the features forming the invention will be specifically pointed out in the claims.

Referring more particularly to the drawings.

Figure 1:
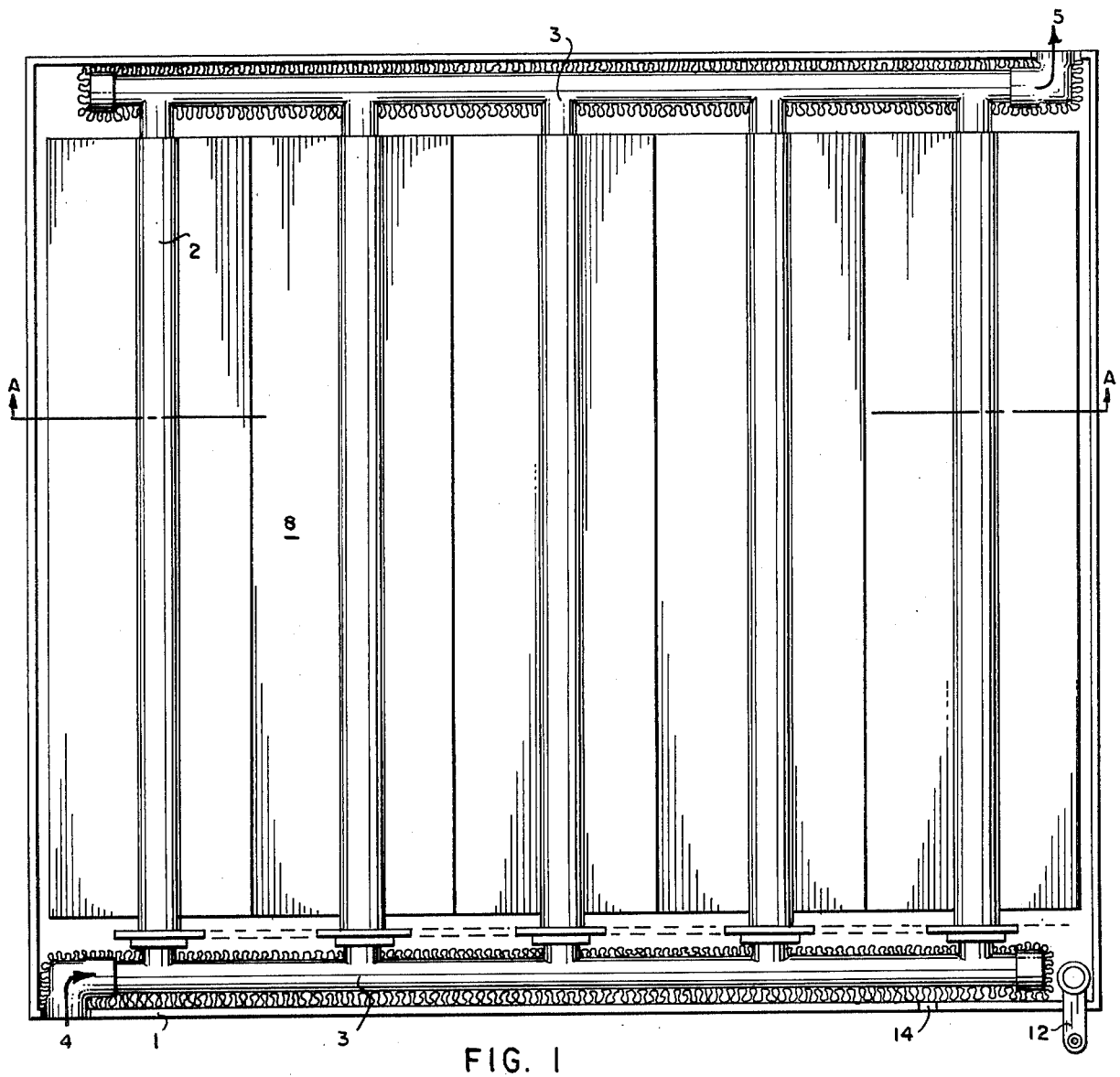
FIG. 1 is a side elevation or face view of the solar heat collecting window.

Referring more particularly to the drawings, the present invention comprises a frame 1 having a plurality of tubes 2 extending thereacross in predetermined spaced relation. The ends of the tubes 2 are connected to headers 3 on opposite sides of the window and an inlet 4 and an outlet 5 are provided in the headers to permit the circulation of water through the tubes from a storage tank (not shown ) or a source of cold water (not shown).

Figure 2:
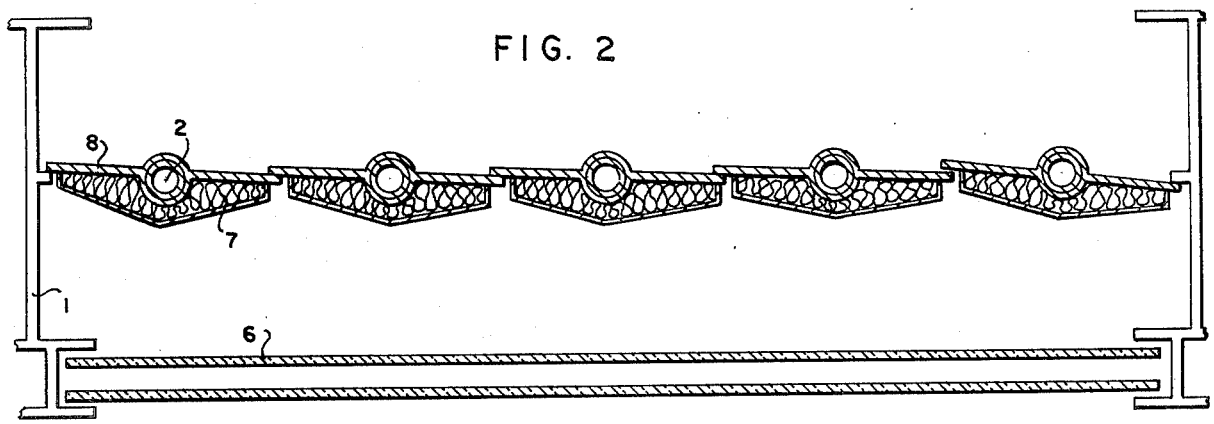
FIG. 2 is a cross sectional view taken on the line A—A of FIG. 1 showing the adjustable vanes in position to insulate the interior of the enclosure in which the window is mounted to facilitate the transmission of cooling action from cool water flowing through the tubes into the enclosure.
Figure 3:
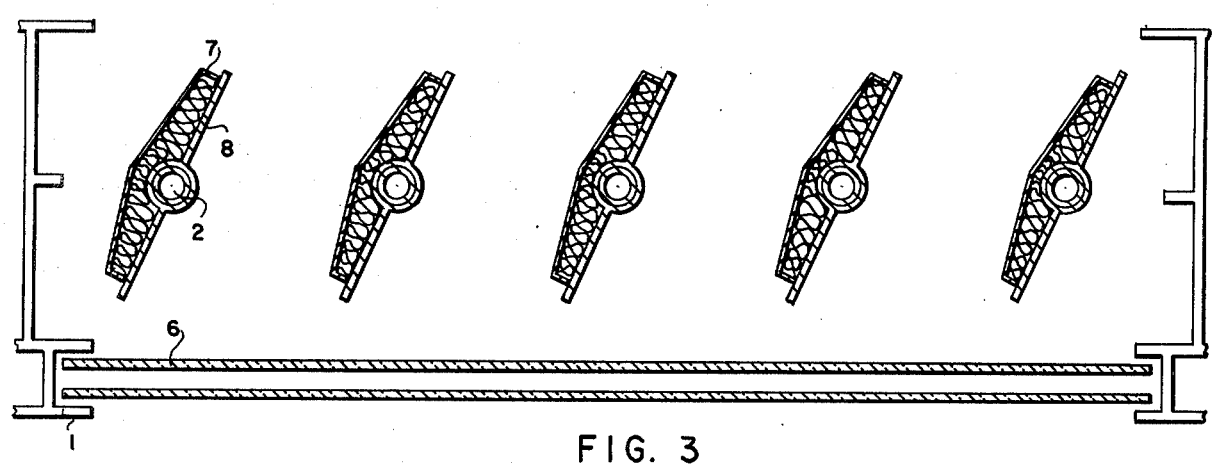
FIG. 3 is a cross sectional view taken on the line A—A of FIG. 1 showing the vanes adjusted to angular position for collecting the solar heat and permitting light to enter the enclosure in which the solar window is mounted.
Figure 4:
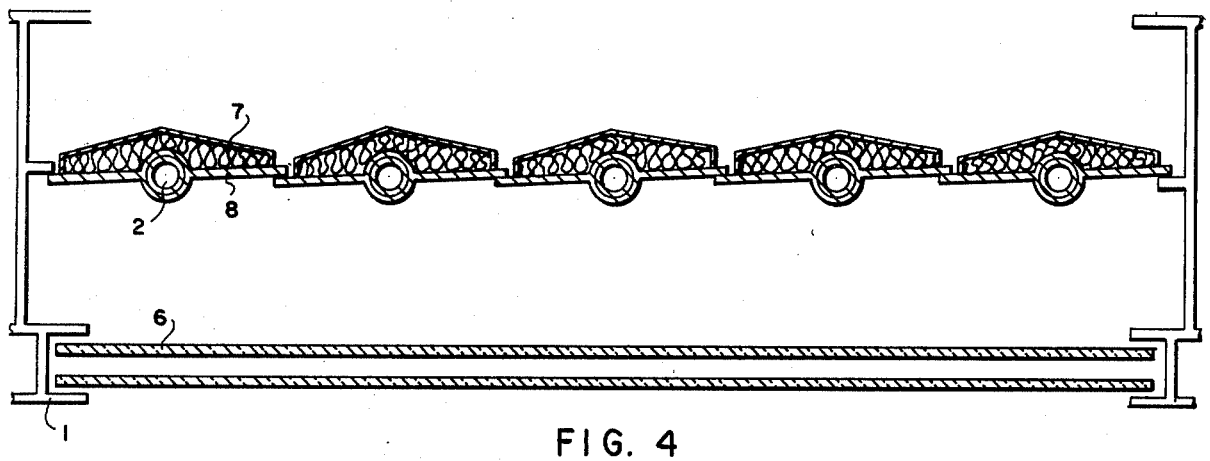
FIG. 4 is a cross sectional view taken on the line A—A of FIG. 1 showing the vanes adjusted to collect solar heat and heat water passing through the tubes.

A glass window or sheet of glass 6 is mounted in the frame 1 as clearly shown in FIGS. 2, 3 and 4.

Mounted interiorly of the glass window are a plurality of vanes 7, these vanes are constructed of any suitable metal, such as copper, aluminum, etc. and the flat side 8 of the vanes 7 have concave positions intermediate their ends which engage the exterior of the tubes 2 forming pivotal axes for the vanes 7.

The flat sides 8 of the vanes 7 are coated with a heat absorbing material of high absorbativity and a high emissivity permitting the vanes to act either for the radiation of heat into the enclosure in which the window is mounted when it is desired to heat such interior or to absorb heat and essiminate cooling action from the tubes into the enclosure when cold water is circulated through the tubes.

Means of any suitable type, such as shown at 12 in FIG. 1 of the drawings to adjust the position of the vanes is provided and it is understood that they all move in unison.

A drain hole 14 is provided to permit seepage of condensation from the window.

The sides of the vanes opposite the flat coated sides are inclined as clearly shown in FIGS. 2, 3, and 4 to permit the pivotal relation between the vanes and the tubes 2. These inclined sides of the vanes are insulated for a high degree of insulation to prevent assimilation of heated or cooled air therethrough.

When the highest degree of heating of water in the tubes 2 is desired, the vanes are adjusted in flatwise edge to edge engagement with each other with the flat coated sides facing the glass 6 in the window and these flat coated sides being coated with absorption material collect the heat and transfer it through the metal to metal contact of the tubes and vanes to the water flowing through the tubes thus heating the water and consequently heating the interior of the room.

The heated water may be delivered to a suitable storage tank (not shown) for reuse.

When the vanes are in the water heating position they will prevent light from entering the enclosure, therefor, when light is desired in the enclosure the vanes may be adjusted to any suitable angular position. This adjustment not only permits light to enter the enclosure, but permits positioning of the vanes so as to receive the full benefit of solar rays as the time of day varies to direct direction of the sun's rays. This adjustment also permits the positioning of the vanes to receive the full effect of the solar rays when they might be impeded by trees in their directional passage to the window.

When it is desired to cool the interior of the enclosure in which the window is mounted, the vanes are adjusted to position the insulated angular sides towards the glass window 6 with the flat coated surface facing the interior of the enclosure as shown in FIG. 2 of the drawings. This positioning of the vanes will serve to insulate heat tending to enter the enclosure through the glass window and when cool water is circulated through the tubes 2 the assimilation of the cooling water will be enhanced and cool the enclosure.

Figure 5:
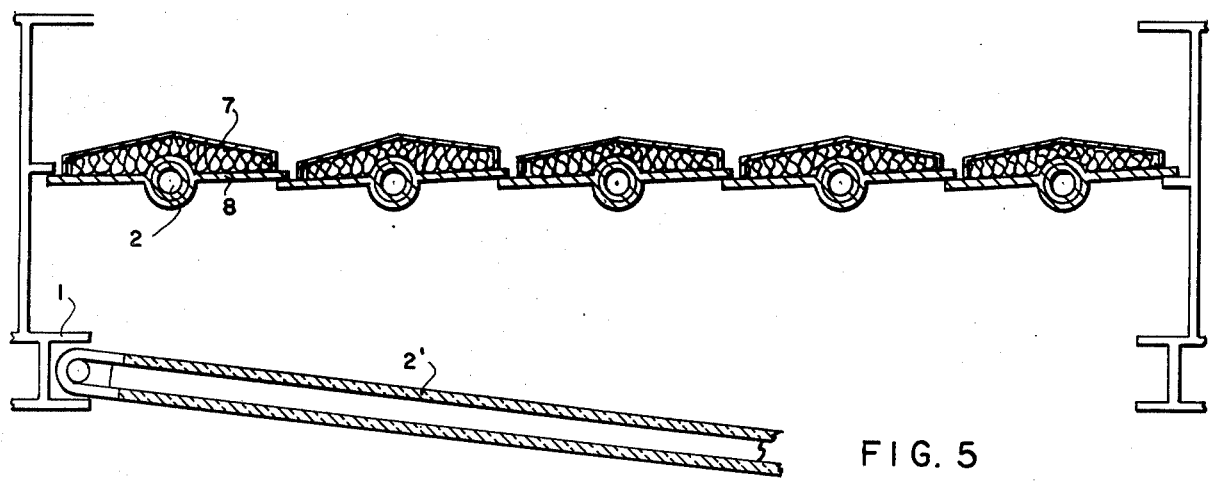
FIG. 5 is a view of a modified form of the window which may be used as a sky light and showing a structure whereby the outer glass sheet may be opened to open the vanes to direct contact with outside atmospheric air.

The solar heat collecting window just described may be used as a skylight in a house, or other suitable building and when so used the sheet of glass 2' shown in FIG. 5 of the drawings is mounted so that it may be moved up and away from the tubes and vanes exposing these units to the night sky, for cooling water in the tubes which water may be subsequently be used through the window tubes for air conditioning the enclosure.

It is to be understood that while in the drawings, the tubes 2 are mounted to run vertically across the window, it is to be understood that they may extend horizontally across the window with corresponding positioning of the vanes withoug departing from the spirit of the present invention.

From the foregoing description and the accompanying drawings it will be apparent that the present invention allows solar heat to be absorbed, but also allows the solar collector plate to vary in pitch so that natural sunlight or daylight may enter the room. Unlike other solar collectors, this solar window collector also acts as a radiator for the utilization of radiant energy at night since the collector plate can be rotated, exposing the collector plate to the room and the rear of the collector plate is insulated, allowing the window to be insulated at night.

During the summer, the function of this window collector may be reversed so that it can be used to keep the house cool by circulating cool water through the coils, thereby reducing the heat gain through the window at the same time cooling the house. It should be noted that a conventional window is a large source of heat loss in the winter, and a large source of heat gain in the summer.

Therefore this invention overcomes the disadvantages of a conventional window related to energy loss in the winter and heat loss in the summer at the same time the energy normally lost during the winter is transmitted to the room. The solar window also acts as an insulator against heat loss to the outside.

The solar window of the present invention is particularly adaptable for use on greenhouses, where it is desirable, not only to control the temperature within the greenhouse, but to control the amount of the sun's rays or light penetrating the glass of the greenhouse and affecting the desired growth and condition of the plants therein. It is customary now days to paint the outside of the glass of a greenhouse to retard the penetration of light therethrough for certain seasons of the year then to wash off this paint at other seasons. The solar window of the present invention would eliminate the necessity of such operations and would permit the direction of the heat generated by the solar rays to be directed as desired on the plants by the pivotal adjustment of the vanes and thus with the use of the present invention the temperature within the greenhouse could be controlled along with the distribution of light therein and thus much fuel or heat creating energy now used in greenhouses as well as the expensive, laborious manner of controlling light distribution would be eliminated.

It will be understood that the invention is not to be limited to the specific construction or arrangement of parts shown, but that they may be modified within the invention defined by the claims.

What is claimed is:

1. In a solar heating and cooling collector window, a frame, a pair of headers at opposite sides of the frame, a plurality of tubes extending in spaced parallel relation across said window and connected to the headers, a plurality of adjustable solar heat collecting vanes pivotally supported within said frame, means for adjusting the angularity of said vanes in unison, said vanes adapted to distribute solar heat collected by them to said tubes and to water circulating through the tubes, a glass window pane spaced a predetermined distance outwardly of said adjusted vanes, and means for moving said glass window pane upwardly and outwardly from said frame to expose the vanes and tubes to atmospheric temperature for permitting regulation of the temperature of water flowing through the tubes by the atmospheric temperature surrounding the unit.

2. In a solar heating and cooling collector window, as claimed in claim 1, said vanes having flat faces on one side having arcuate indentations therein for engaging said tubes.

3. In a solar heating and cooling collector as claimed in claim 1, wherein said glass window pane moving means is constructed to hold the glass window pane normally in tight fitting engagement with the frame and in the desired spaced relation to said vane.

* * * * *